(12) United States Patent
Ryan et al.

(10) Patent No.: US 7,766,195 B2
(45) Date of Patent: Aug. 3, 2010

(54) ROTARY FEEDING SYSTEM

(75) Inventors: Lisa Jo Ryan, Lakeville, MN (US); Peter A. Huberg, Shoreview, MN (US); Gary O. Bendickson, Maple Plain, MN (US); Joana A. Montenegro, Prior Lake, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 675 days.

(21) Appl. No.: 11/737,906

(22) Filed: Apr. 20, 2007

(65) Prior Publication Data

US 2007/0245952 A1 Oct. 25, 2007
US 2009/0071398 A9 Mar. 19, 2009

Related U.S. Application Data

(60) Provisional application No. 60/794,758, filed on Apr. 25, 2006.

(51) Int. Cl.
*G01F 11/10* (2006.01)

(52) U.S. Cl. .................. 222/368; 222/227; 222/238; 222/270; 222/271; 222/410; 221/201; 221/203; 426/289; 426/454

(58) Field of Classification Search .................. 222/161, 222/217, 226–227, 236, 238, 270–272, 368; 222/410; 426/289, 454; 366/150.1, 182.1, 366/290; 221/173, 200–205; 118/13, 24, 118/301, 308, 676; 198/384, 393, 397.04
See application file for complete search history.

(56) References Cited

U.S. PATENT DOCUMENTS

| | | | | |
|---|---|---|---|---|
| 3,774,814 A | * | 11/1973 | Vidjak | 222/220 |
| 4,211,492 A | | 7/1980 | König et al. | |
| 4,500,012 A | * | 2/1985 | Ackley | 221/173 |
| 5,454,464 A | * | 10/1995 | Yamamoto et al. | 198/384 |
| 5,514,399 A | | 5/1996 | Cordera et al. | |
| 5,775,804 A | | 7/1998 | Meier | |
| 5,797,435 A | * | 8/1998 | Wada | 141/81 |
| 5,924,969 A | * | 7/1999 | Waluda | 493/374 |
| 6,189,733 B1 | | 2/2001 | Nemoto et al. | |
| 6,520,111 B2 | * | 2/2003 | Lang | 118/13 |
| 6,564,729 B1 | * | 5/2003 | Petzoldt | 111/179 |
| 6,986,439 B2 | * | 1/2006 | Itoh | 221/167 |

* cited by examiner

*Primary Examiner*—Kevin P Shaver
*Assistant Examiner*—Andrew P Bainbridge
(74) *Attorney, Agent, or Firm*—Arlene L. Hornilla; Paul J. Haun

(57) ABSTRACT

Methods and apparatus for accurately and repeatably depositing edible particulates on edible products. A dual-drum rotary feed system accurately meters an amount of edible particle for each edible product with a first rotary drum while a second rotary drum deposits the edible particulates onto or within the edible product. The dual-drum rotary feeder can comprise replaceable drums wherein drums can be quickly removed and replaced for cleaning, sanitization and to adjust processing conditions such as, for example, changes in production rates and/or product size.

11 Claims, 8 Drawing Sheets

ROTARY FEEDING SYSTEM

CROSS-REFERENCE TO RELATED APPLICATIONS

This application claims the benefit of priority under 35 U.S.C. 119(e)(1) of a provisional patent application Ser. No. 60/794,758, filed Apr. 25, 2006, which is incorporated herein by reference in its entirety.

FIELD OF THE INVENTION

The invention relates generally to handling and feeding edible particulates during food processing/manufacturing. More specifically, the invention is directed to a rotary drum feeder having retrofittable drums, providing for quick change-out of the drums for quickly changing and adjusting particulate feed rates.

BACKGROUND OF THE INVENTION

Edible particulates are frequently included, either within or on an upper surface, of edible food products. In one representative example, dough or batter based food products such as cookies, muffins and bars, can include any of a variety of suitable edible particulates. These edible particulates can comprise a wide variety of particulates such as, for example, chocolate chips, butterscotch chips, whole and bit portions of candy, raisins, nuts and whole and bit portions of fruit.

When food products are prepared in high volume production processes, edible particulates are generally supplied to a processing line from a bulk supply source. Representative particulate feeders for supplying high volume production equipment can include conveying systems and/or vibratory feed systems. Depending upon the production process and the type of edible food product being prepared, these conveying and/or vibratory feed systems can be successfully employed to transport the edible particulate from the bulk supply so that the particulates can ultimately become an integral component of the final edible food product.

While conveying and/or vibration based feed systems can be successfully used in certain high volume processing/manufacturing settings, there are situations in which such feed methods are impractical and/or burdensome on the production process. For instance, production situations in which accuracy and repeatability of the feeding process is necessary can prove difficult for conveyor and/or vibration feed systems. In addition, process changes requiring differing particulate feed rates can be difficult to quickly address with conveyor and/or vibration based particulate feeding systems. As such, it would be advantageous to have an accurate, repeatable feed system for edible particulates that is quickly adaptable to changing process conditions such as, for example, size, volume and quantity of edible products being prepared.

SUMMARY OF THE INVENTION

The invention addresses the aforementioned needs by providing a rotary feed system for more accurately and repeatably preparing edible products having particulates. Through the use of a dual-drum rotary feed system, accurate metering of edible particulates is continually accomplished for preparing substantially equivalent edible products. The dual-drum rotary feed system can include quick-change drums to provide quick and easy adjustment for varying the portions of edible particulates dispensed. In addition, quick-change drums can allow for fast and easy cleaning and sanitation of the dual-drum rotary feed system such that the feed system experiences less downtime.

In one aspect, the invention is directed to an edible particulate feed system having a plurality of rotating drums. A first receiving drum has a plurality of spaced apart receiving apertures for receivably accepting edible particulates from a feed source such as, for example, a gravity feeding bin, a feed conveyor, a vibratory feeder and the like. Each of the plurality of spaced apart receiving apertures has a selected particulate volume such that equivalent amounts of edible particulates are accommodated in each receiving aperture. The first receiving drum is rotatable wherein the loaded receiving apertures are aligned and positioned for loading of a plurality of spaced apart dispensing apertures on a second dispending drum. Each dispensing aperture has a similar particulate volume as the receiving apertures such that all of the edible particulates from one receiving aperture are accommodated within one dispensing aperture. The second dispensing drum can rotate wherein the loaded dispensing apertures can subsequently deposit the portioned, substantially equivalent amounts of edible particulates onto or into an edible product. The edible particulate feed system can make use of suitable components such as, for example, variable-frequency-drives, positioning sensors and controls for rotating the first receiving drum and the second dispensing drum at appropriate speeds for proper interfacing of the receiving apertures and dispensing apertures as well as accommodating the overall production speed of the edible particulates.

In another aspect, the invention is directed to an edible particulate feed system having a plurality of quick-change portioning drums. A first quick-change drum has a plurality of spaced apart receiving apertures for receivably accepting edible particulates from a feed source such as, for example, a gravity feeding bin, a feed conveyor, a vibratory feeder and the like. A second-quick change drum has a plurality of receiving apertures adapted to receive edible particulates from corresponding receiving apertures on the first quick-change drum. Both the first quick-change drum and the second quick-change drum are removable from the edible particulate system providing quick and easy access for sanitization and cleaning as well as allowing for change-out of the first and second quick-change drums to accommodate different edible product sizes and/or production rates.

In another aspect, the invention is directed to a method for adding edible particulates to edible products. A metering step can comprise filling receiving apertures on a first rotary drum with edible particulates from a bulk filling apparatus. An interface step can comprise rotating the first rotary drum such that edible particulates in the receiving apertures can be directed into corresponding dispensing apertures on a second rotary drum. A dispensing step can comprise rotating the second rotary drum such that the edible particulates are dispensed from the dispensing apertures either onto or into an edible product or into additional processing equipment for forming the edible product.

As used through the specification, one of ordinary skill in the art will understand the term "repeatable" and its various permutations, when used with reference to the metering of edible particulates, to mean substantially repeatable in that variations in the size and shape of edible particulates may result in generally insignificant variations in the amount of edible particulates metered and dispensed onto individual food products.

The above summary of the various embodiments of the invention is not intended to describe each illustrated embodi-

BRIEF DESCRIPTION OF THE DRAWINGS

The invention may be more completely understood in consideration of the following detailed description of various embodiments of the invention in connection with the accompanying drawings, in which.

Figure 1:
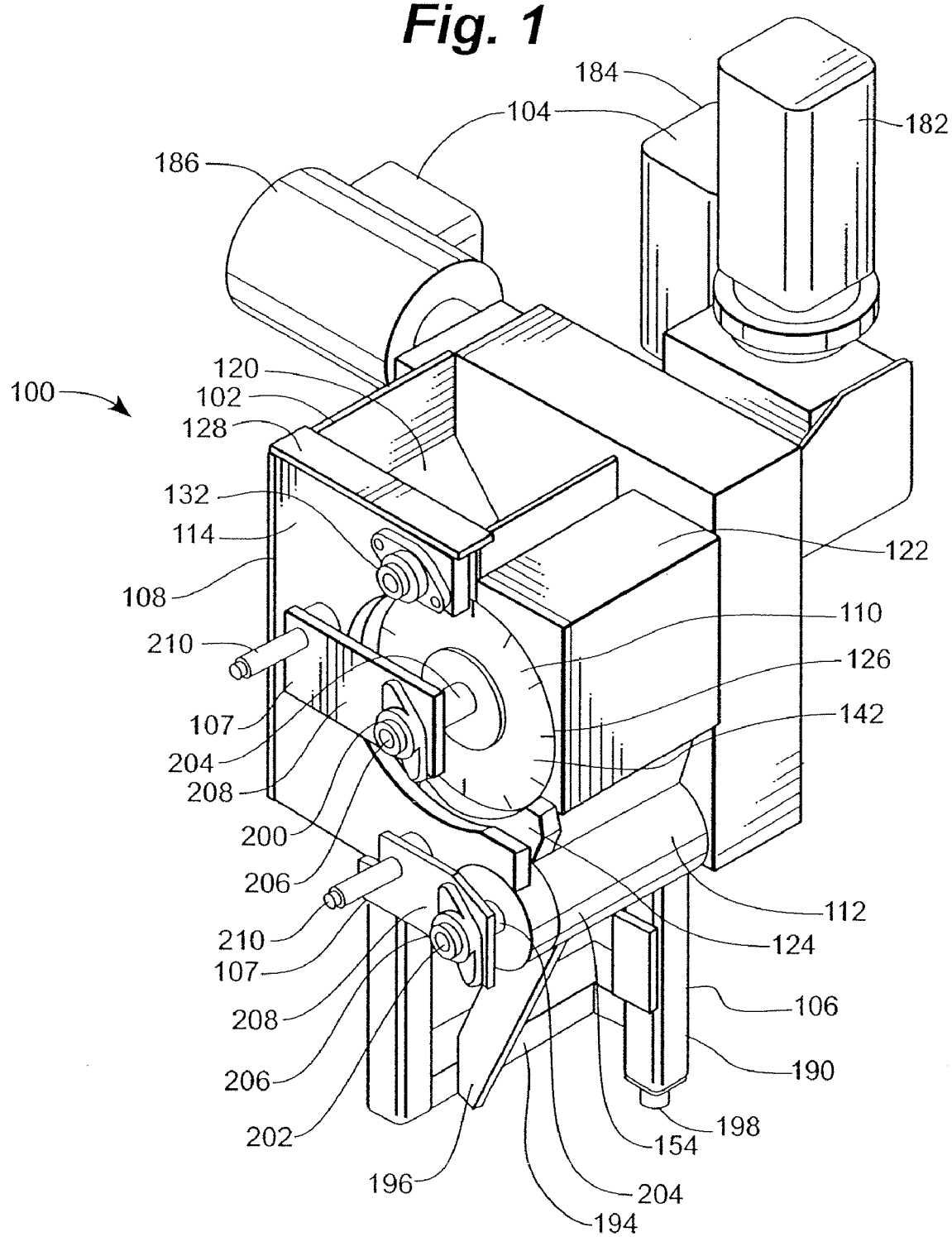
FIG. 1 is a perspective view of an embodiment an edible particulate feeder of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 2:
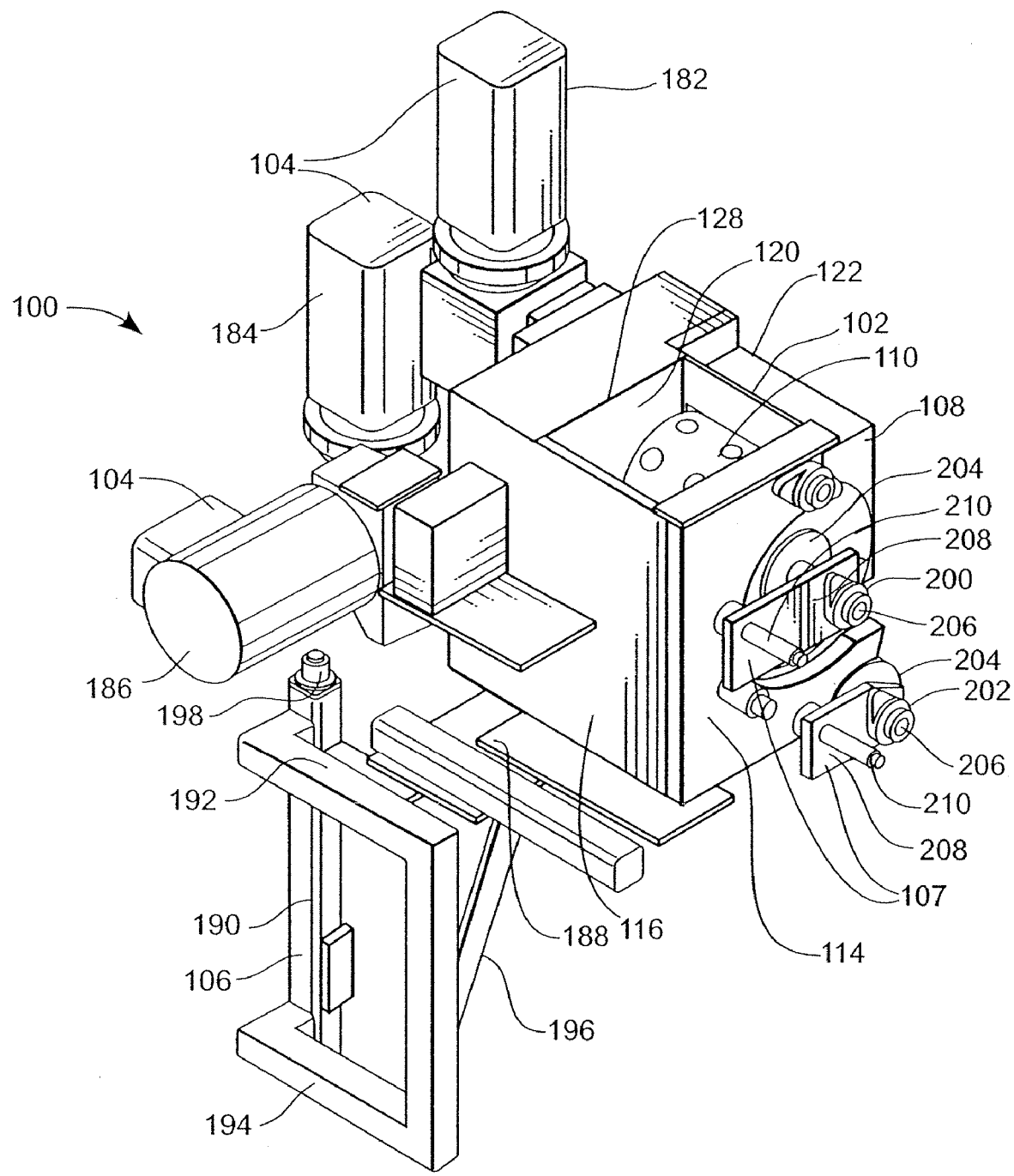
FIG. 2 is a perspective view of the edible particulate feeder of FIG. 1.

As illustrated in FIGS. 1 and 2, a representative embodiment of an edible particulate feeder 100 generally comprises a particulate handling portion 102, a drive portion 104, a mounting portion 106 and a quick-change portion 107. Edible particulate feeder 100 can comprise appropriate materials of construction for use in high volume production and processing of edible food products including routine sanitization and cleaning. Representative materials for use in edible particulate feeder 100 can comprise stainless steel, aluminum and suitable plastics.

With reference to FIGS. 1, 2, 3, 4 and 5, particulate handling portion 102 can comprise a drum housing 108, a receiving drum 110 and a dispensing drum 112. Drum housing 108 is generally defined by a front mounting plate 114, a side mounting plate 116, a rear mounting plate 118, a feed bin 120, a portioning wall 122 and a transfer block 124. Front mounting plate 114, portioning wall 122 and transfer block 124 generally define a receiving drum mount area 126. Feed bin 120 is generally defined by a bin loading end 128 and a bin dispensing end 130. Feed bin 120 can comprise a bin agitation assembly 132. Portioning wall 122 comprises an inner portioning surface 134 defining a generally arcuate profile adapted to closely conform to and interface with the receiving drum 110. Transfer block 124 can comprise a receiving surface 136 and a dispensing surface 138 having a plurality of transfer bores 140 defined therebetween.

Figure 3:
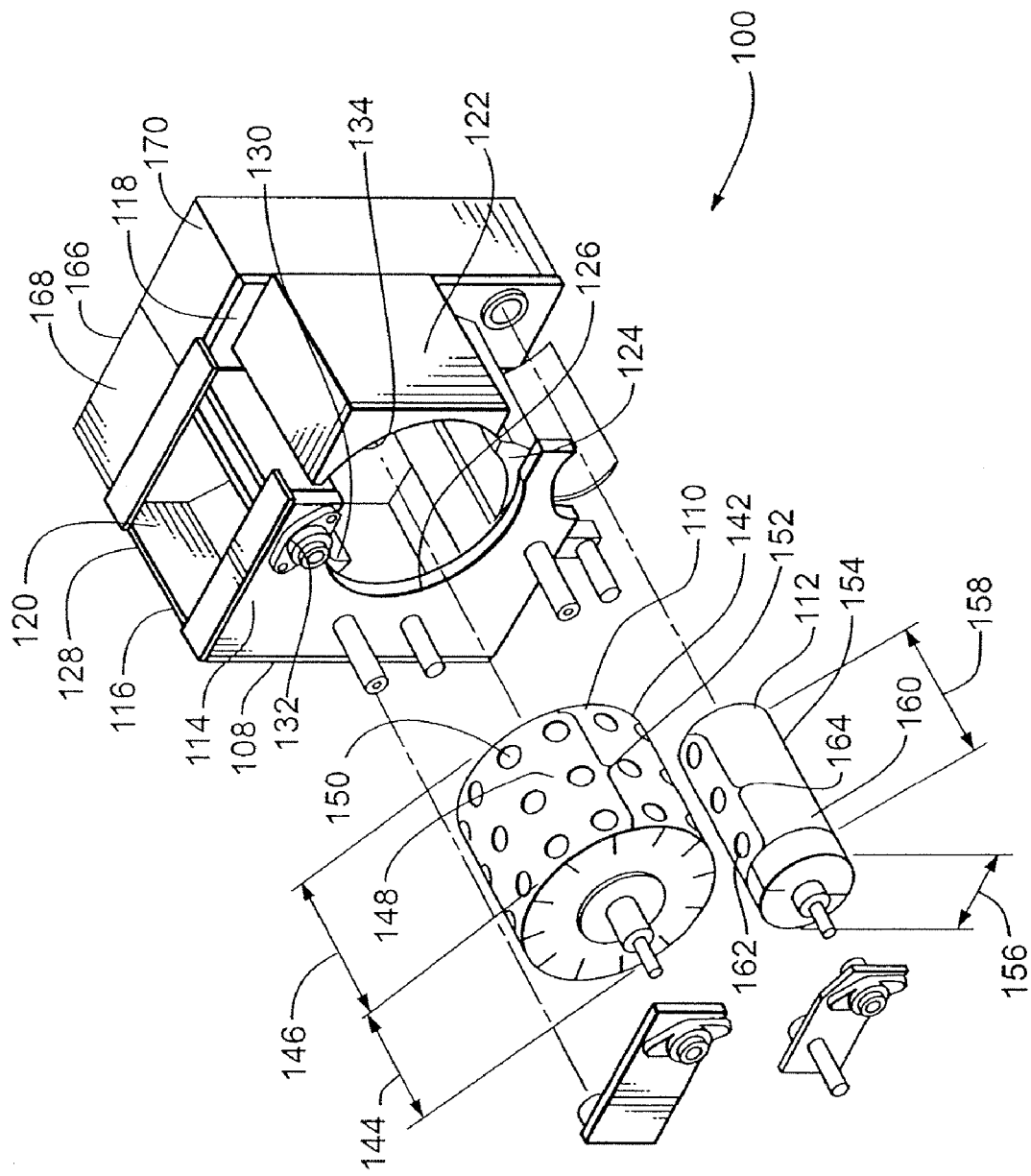
FIG. 3 is an exploded, perspective view of the edible particulate feeder of FIG. 1.

Referring to FIG. 3, receiving drum 110 can comprise a receiving drum body 142 defined by a receiving drum diameter 144, a receiving drum width 146 and a receiving drum perimeter surface 148. Receiving drum perimeter surface 148 comprises a plurality of spaced apart receiving apertures 150 arranged so as to define a plurality of receiving aperture rows 152. Each receiving aperture 150 can define a generally cylindrical receiving area for receiving desired quantities of edible particulates based on the volume of the receiving area. Each receiving aperture row 152 can comprise any number of receiving apertures 150, for example three receiving apertures 150 per receiving aperture row 152 as shown in FIG. 3. The number of receiving apertures 150 per receiving aperture row 152, as well as the number of receiving aperture rows 152, can vary based upon manufacturing characteristics of the edible products being produced such as, for example, production volume and product size. In addition, the size and shape of receiving apertures 150 can be varied.

As illustrated in FIG. 3, dispensing drum 112 can comprise a dispensing drum body 154 defined by a dispensing drum diameter 156, a dispensing drum width 158 and a dispensing drum perimeter surface 160. Dispensing drum perimeter surface 160 comprises a plurality of spaced apart dispensing apertures 162 arranged so as to define a plurality of dispensing aperture rows 164. Each dispensing aperture 162 can define a generally cylindrical dispensing for dispensing desired quantities of edible particulates based on the volume of the dispensing area. Each dispensing aperture 162 has a dispensing area volume that is equal to or greater than the volume of the receiving area of each receiving aperture 150. Each dispensing aperture row 164 can comprise any number of dispensing apertures 130. Generally, the size and spacing of the dispensing apertures 162 within each dispensing aperture row 164 will correspond to the size and spacing of the receiving apertures 150 within each receiving aperture row 152.

Figure 4:
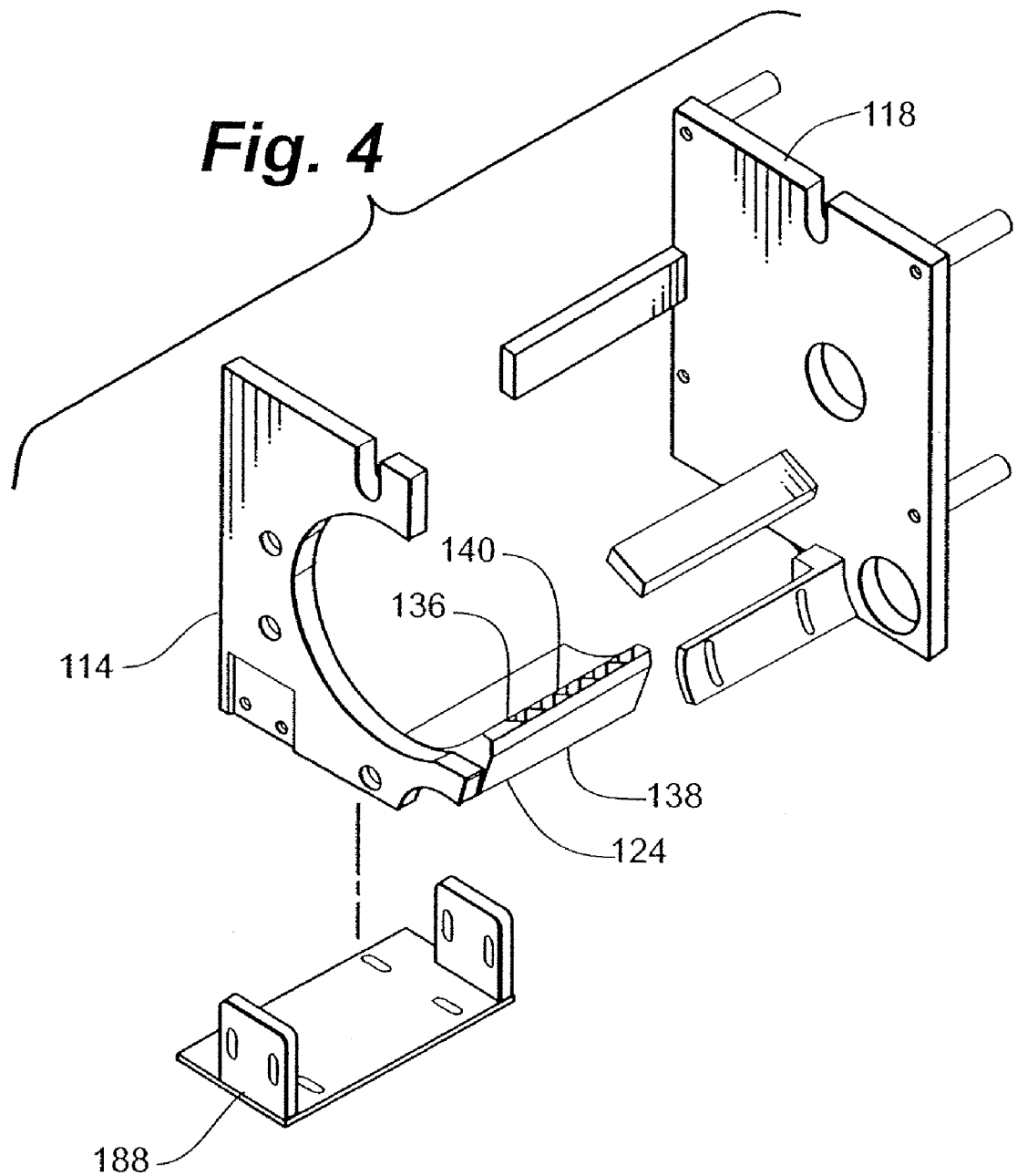
FIG. 4 is an exploded, perspective view of a frame assembly portion of the edible particulate feeder of FIG. 1.
Figure 5:
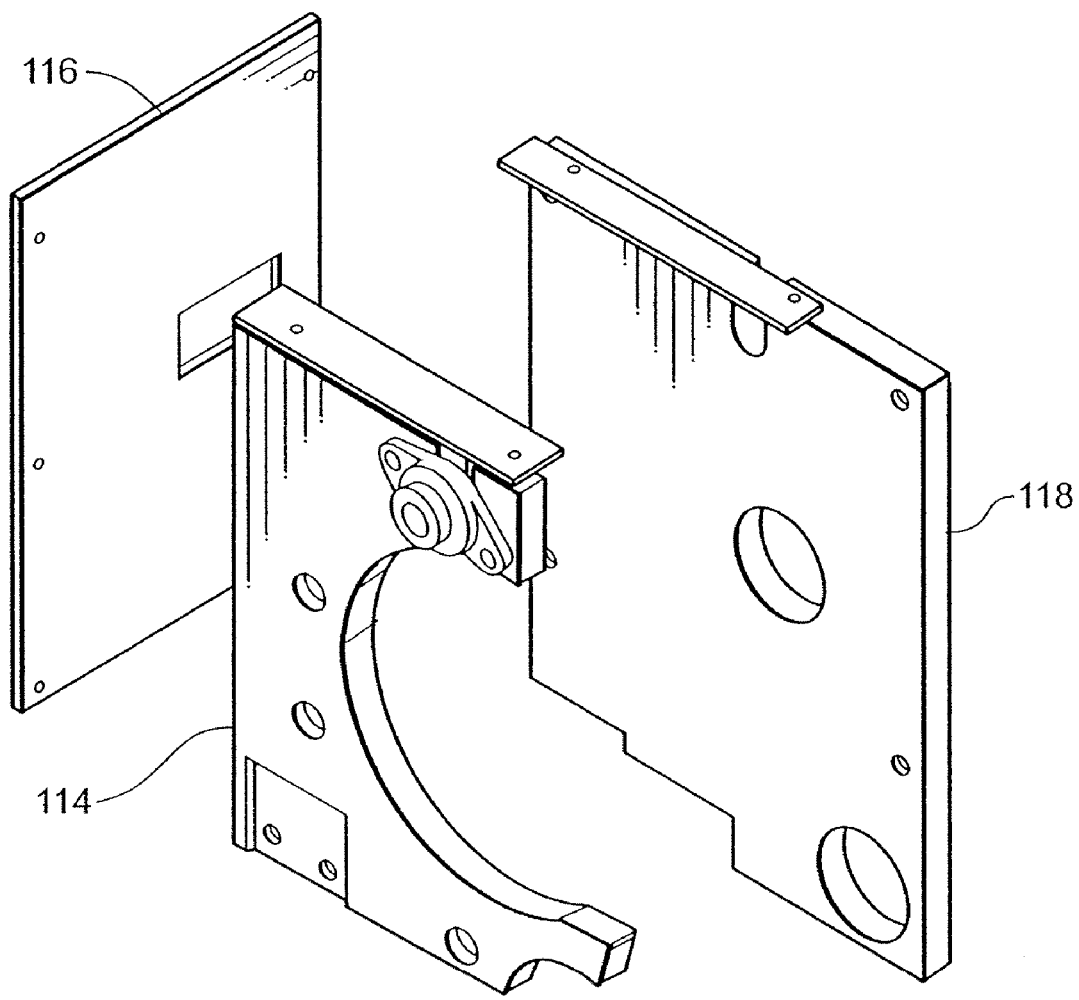
FIG. 5 is an exploded, perspective view of the frame assembly portion of FIG. 4.
Figure 6:
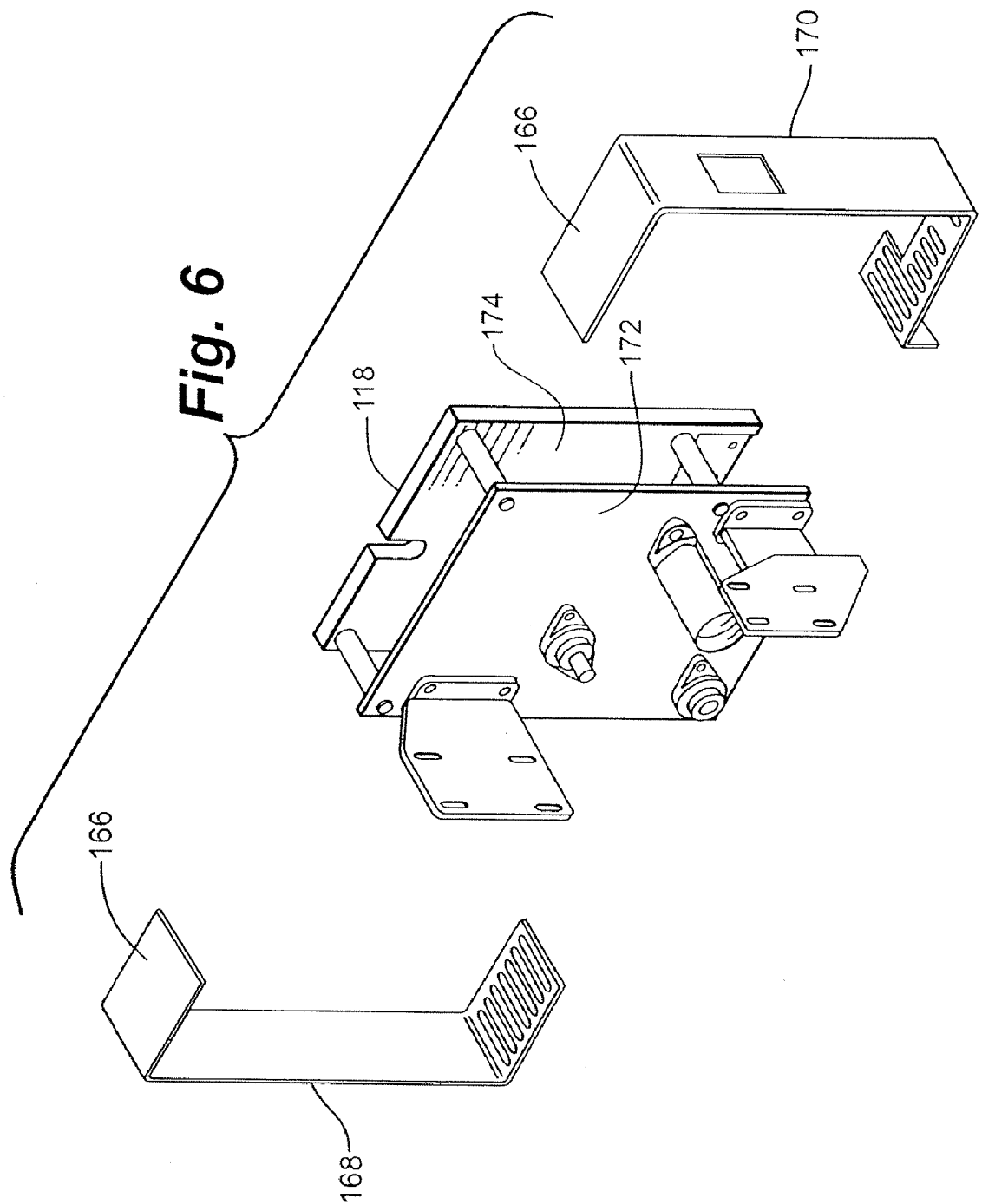
FIG. 6 is an exploded, perspective view of a shaft housing assembly of the edible particulate feeder of FIG. 1.
Figure 7:
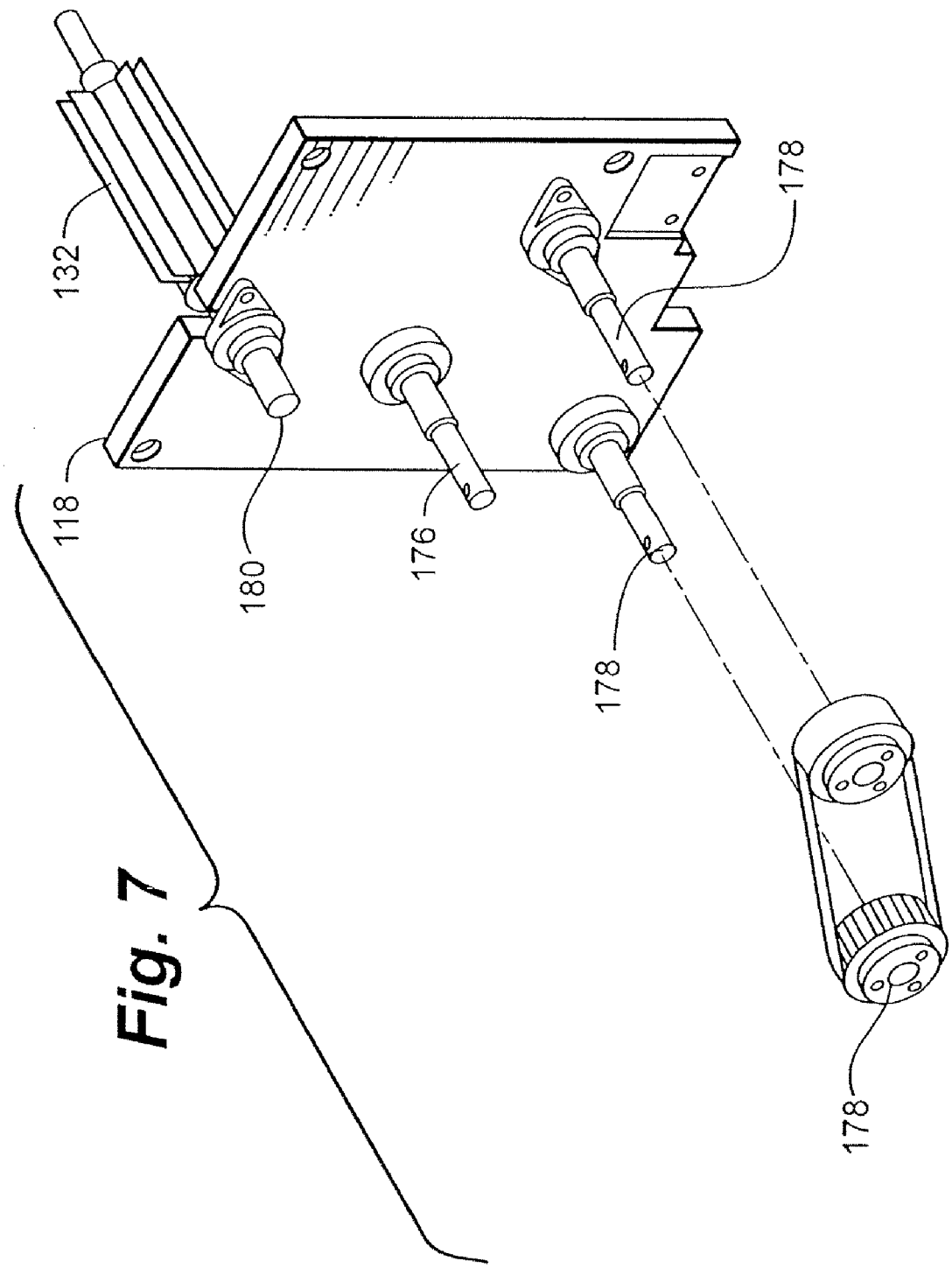
FIG. 7 is an exploded, perspective view of the shaft housing assembly of FIG. 6.

As shown in FIG. 4, the transfer block 124 is mounted between the receiving drum 110 and the dispensing drum 112 with the receiving surface 136 proximate the receiving drum 110 and the dispensing surface 138 proximate the dispensing drum 112. Transfer bores 140 preferably resemble in size and appearance the receiving apertures 150 and dispensing apertures 162. In a preferred embodiment, the number of transfer bores 140, receiving apertures 150 and dispensing apertures 162 are equal. As such, transfer bores 140 generally serve to operably interconnect one receiving aperture 150 with a corresponding dispensing aperture 162 when the receiving drum 110 is rotatably positioned with one receiving aperture row 152 proximate the receiving surface 136 and one dispensing aperture row 164 proximate the dispensing surface 138.

Referring to FIGS. 1, 2, 6 and 7, drive portion 104 can comprise a shaft housing 166 having a first housing portion 168, a second housing portion 170 and a drive mounting wall 172. When combined with rear mounting plate 118, the first housing portion 168, second housing portion 170 and drive mounting wall 172 define an enclosed drive shaft area 174 for preventing personnel exposure to rotating drive shafts including a receiver drum drive shaft 176, a dispensing drum drive shaft 178 and an agitation drive shaft 180. Attached to a rear exposed surface of the drive mounting wall 172 is a receiving drum drive motor assembly 182 and a dispensing drum drive motor assembly 184. Attached to side mounting plate 116 is an agitation drive motor assembly 186.

Figure 8:
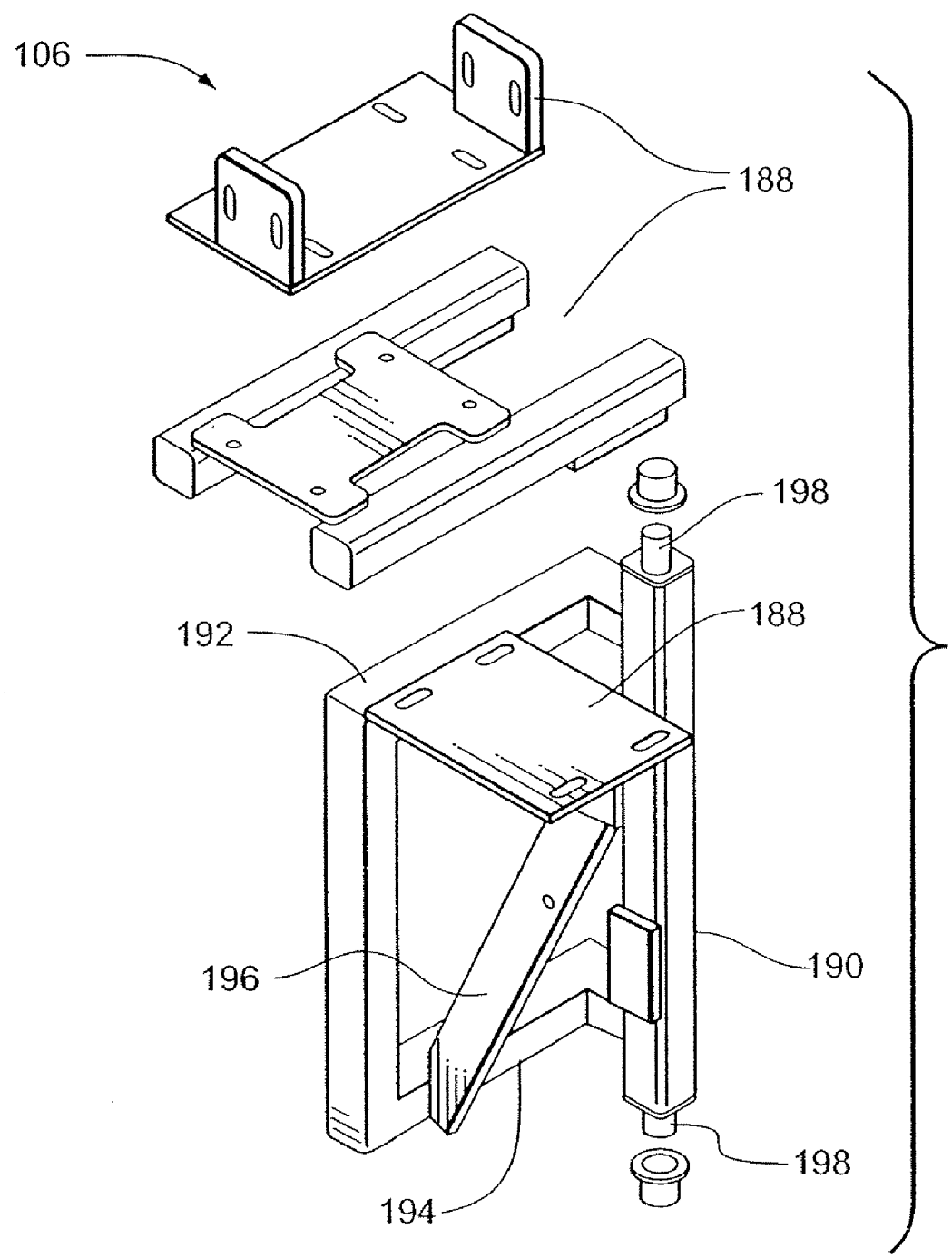
FIG. 8 is an exploded, perspective view of a mounting portion of the edible particulate feeder of FIG. 1.

As illustrated in FIGS. 1, 2 and 8, mounting portion 106 can comprise a mounting platform 188 operably attaching to and supporting the particulate handling portion 102. Mounting platform 188 can attach to a rotating support bracket 190 having an upper horizontal support member 192, a lower horizontal support member 194 and a brace member 196.

Rotating support bracket 190 can further comprise upper and lower mounting pins 198 for rotatably mounting the edible particulate feeder 100 with respect to other process machinery such as, for example, extruders, conveyors and the like.

Quick-change portion 107 can comprise a receiving drum mounting assembly 200 and a dispensing drum assembly 202. Receiving drum mounting assembly 200 and dispensing drum assembly 202 can be similar with respect to components, materials of construction and operation but can differ based upon size and strength requirements necessary for proper operation and function with the corresponding receiving drum 110 and dispensing drum 112. Generally, the receiving drum mounting assembly 200 and dispensing drum assembly 202 each comprise a shaft collar 204, a bearing assembly 206, an alignment plate 208 and a mounting shaft 210.

As will be understood by a person of skill in the art, the edible particulate feeder 100 and its related components and sub-components can be assembled using suitable fabrication techniques. In order to prevent unnecessary confusion and obfuscation with respect to the current invention, individual fasteners used in the construction of the edible particulate feeder 100 have not been individually identified within the specification. In addition to the use of fasteners, other appropriate joining and/or fastening techniques, such as for example, welding, can be used to construct the edible particulate feeder 100.

In use, the edible particulate feeder 100 can supply edible particulates to a variety of food processing machinery for manufacturing ready-to-eat or ready-to-cook edible products. Edible particulate feeder 100 provides repeatable, portioned amounts of edible particulates for placement on an exterior surface or within an edible product.

Generally, a bulk amount of edible particulates is fed into the bin loading end 128 of feed bin 120. Depending upon processing variables such as, for example, production volume and processing sophistication, the edible particulates can be manually loaded or continually, automatically loaded using suitable bulk feeding equipment such as, for example, a vibratory feeder. A wide variety of edible particulates, in either a whole or bit amount, can be portioned and supplied with the edible particulate feeder including items such as, for example, candy particulates, nut particulates, fruit particulates and vegetable particulates. Due to the unique quick-change aspects of the edible particulate feeder 100, which is discussed in detail below, the use of edible particulate feeder 100 can be especially beneficial in portioning and dispensing edible particulates which by their nature are susceptible to melting, smearing and/or deformation including items such as, for example, chocolate, peanut butter, butterscotch and/or similarly flavored chips and/or chunks.

Within feed bin 120, the bin agitation assembly 132 driven by agitation drive motor assembly 186, prevents the edible particulates from agglomerating such that the edible particulates are readily gravity fed to the bin dispensing end 130. At the same time, receiving drum drive motor assembly 182 causes receiving drum 110 and more specifically, receiving drum perimeter surface 144 to rotate past the bin dispensing end 130. As the receiving drum perimeter surface 144 rotates, the receiving aperture rows 152 are sequentially directed past the bin dispensing end 130 such that each receiving aperture 150 is exposed to and consequentially filled with the edible particulates. As the receiving drum 110 continues its rotation, filled receiving apertures 150 encounter the portioning wall 122 wherein excess edible particulates are essentially swept from the receiving apertures 150 and retained within the feed bin 120 due to the close conformity of the inner portioning surface 134 with the receiving drum perimeter surface 144. These excess edible particulates remain within the bulk feeder 120 for loading into receiving apertures 150 within a subsequent receiving aperture row 152.

As receiving drum 110 continues its rotation, a filled receiving aperture row 150, comprising a plurality of equivalently filled receiving apertures 150, traverses the portioning wall 122, and more specifically the inert portion surface 134 such that the edible particulates are physically retained within the receiving apertures 150. As the receiving drum 100 continues its rotation, the filled receiving aperture row 150 encounters the receiving surface 136 of transfer block 124. At the receiving surface 136, each filled receiving aperture 150 is placed into aligned relation with a corresponding transfer bore 140, wherein the edible particulates are subsequently gravity released from the filled receiving apertures 150 and enter the transfer bore 140.

As the edible particulates fall from each receiving aperture 150 into the corresponding transfer bore 140, the edible particulates are directed from the receiving surface 136 to the dispensing surface 138. At the dispensing surface 138, the transfer bores 140 interface with the dispensing drum 112. The dispensing drum 112 is generally rotated by the dispensing drum drive motor assembly 184 such that the dispensing drum 112 rotates in an opposed direction to the receiving drum 110. The dispensing drum perimeter surface 160 is rotated along the transfer block 124 such that each dispensing aperture row 164 is directed proximate the dispensing surface 138 wherein each dispensing aperture 162 is placed into aligned relation with the corresponding transfer bore 140. Once a dispensing aperture 162 is aligned with its corresponding transfer bore 140, the edible particulates fall from the transfer bore 140 into the dispensing aperture 162. Dispensing apertures 162 generally have a volume that is greater than or equal to the receiving apertures 150 such that the dispensing aperture 162 accepts the entire volume of edible particulates within each transfer bore 140. As the dispensing drum 112 continues to turn, the now filled dispensing apertures 162 are directed to a downwardly facing disposition where the portioned amounts of edible particulates can be transferred to another processing system or placed onto a food product.

During operation of the edible particulate feeder 100, it can become necessary at various times to terminate the dispensing of the edible particulates and adjust process variables or to clean/sanitize the edible particulate feeder 100. For instance, it can become necessary to vary the amount of edible particulates being dispensed with edible particulate feeder 100 based on product size or type. Alternatively, it may be necessary to clean and/or sanitize the edible particulate feeder 100 if the type of edible particulate changes or following production runs or designated time periods.

In order to reduce process downtime, edible particulate feeder 100 provides for rapid adjustment of particulate dispensing and cleaning/sanitization by providing for quick and easy removal and replacement of receiving drum 110 and dispensing drum 112. Receiving drum 110 is externally accessible for change-out utilizing the receiving drum mounting assembly 200 while the dispensing drum 112 is similarly accessible with the dispensing drum mounting assembly 202. For example, both the receiving drum 110 and dispensing drum 112 can be quickly and easily replaced by removing the appropriate shaft collar 204 from the corresponding drive shaft, either receiver drum drive shaft 176 or dispensing drum drive shaft 178. Once the shaft collar 204 has been removed from the appropriate drive shaft, the alignment plate 208 including the bearing assembly 206 can be pulled from the drive shaft such that the alignment plate 208 can be rotated about the mounting shaft 210 such that either the receiving drum 110 or the dispensing drum 112 is exposed for removal. In some instances, a portable davit assembly or similar lifting apparatus can be used to slidably withdraw the exposed drum, either receiving drum 110 or dispensing drum 112.

For purposes of adjusting process variables including changing production rates and the amount of particulates dispensed, receiving drum 110 can be replaced with a second receiving drum that is substantially the same as receiving drum 100 with respect to exterior dimensions and construction with the exception of possible changes to the configuration of the receiving aperture rows 152 and the individual receiving apertures 150. For instance, more or less edible particulates can be dispensed by selectively increasing or decreasing the volume of the receiving apertures 150. In some instances, the number of receiving aperture rows 152 on the receiving drum perimeter surface can be selectively increased or decreased to accommodate increased or decreased production of the food product.

Depending upon the types of changes made to receiving drum 110, it may become necessary to similarly replace the transfer block 124 and dispensing drum 112, especially in the instance when changes are made to the size and/or spacing of the receiving apertures 150. When such changes are made, a second transfer block and second dispensing drum having transfer bores 140 and dispensing apertures 162 corresponding to the receiving apertures 150 on the second receiving drum, can be reinstalled to the edible particulate feeder 100.

In the case of cleaning and/or sanitization of the edible particulate feeder 100, removal of the receiving drum 110, dispensing drum 112 and transfer block 124 can provide for easier access to surfaces in frequent contact with the edible particulates. In addition, receiving drum 110, dispensing drum 112 and transfer block 124 can each be replaced with a similarly configured drum or block, such that the edible particulate feeder 100 can be quickly brought on line with "clean" components while the receiving drum 110, dispensing drum 112 and transfer block 124 are cleaned and/or sanitized as individual components. This can provide for decreased downtime and increased production as compared to feeding units requiring cleaning and/or sanitization in an assembled or semi-assembled state.

To facilitate operation of the edible particulate feeder 100, it will be understood that suitable control and monitoring instrumentation can be utilized to ensure proper coordination of the receiving drum 110 and dispensing drum 112. For instance, operation and rotation of the receiving drum 110 and dispensing drum 112 can be conducted using a suitable control instrument such as, for example, a microprocessor based control system or a PLC (Programmable Logic Controller) based system. In addition, positioning of the drum and more particularly, the aperture rows can be verified using optical, mechanical, proximity and/or other representative sensors and transmitters providing positioning information to the control system. In addition to varying process conditions by replacing the receiving drum 110, dispensing drum 112 and transfer block 124, the various drive systems including the receiving drum drive motor assembly 182 and the dispensing drum drive motor assembly 184 can include variable speed motors wherein rotation speeds for the receiving drum 110 and dispensing drum 112 can be selectively varied. In addition to controlling operation of the edible particulate feeder 100, the control instrument can interface with other processing equipment including, for example, a particulate feeding system for filling the feed bin 120 with edible particulates and any processing equipment subsequent to the edible particulate feeder 100 for preparing the food product such as for example, conveying and/or packaging equipment.

Although various embodiments of the invention have been disclosed here for purposes of illustration, it should be understood that a variety of changes, modifications and substitutions may be incorporated without departing from either the spirit or scope of the invention.

What is claimed:

1. A feeder for delivering edible particulates comprising:
    a frame assembly having a feeder bin, a portioning wall and a transfer block, the portioning wall having an arcuate interior surface and the transfer block having a plurality of transfer bores defined between a receiving surface and a dispensing surface;
    a receiving drum having a receiving drum perimeter surface with a plurality of receiving aperture rows defined therein, each receiving aperture row having a plurality of receiving apertures; and
    a dispensing drum having a dispensing drum perimeter surface with a plurality of dispensing aperture rows, each dispensing aperture row having a plurality of dispensing apertures,
    wherein the receiving drum perimeter surface interfaces with the arcuate interior surface; and
    wherein edible particulates from one receiving aperture row are dispensed through the transfer bores into one dispensing aperture row.

2. The feeder of claim 1, wherein the feeder bin comprises an agitation assembly adapted to substantially eliminate edible particulate agglomeration within the feeder bin.

3. The feeder of claim 1, wherein the frame assembly further comprises a receiving drum mounting assembly coupled to the receiving drum, the receiving drum mounting assembly adapted for pivotable removal of the receiving drum from the frame assembly.

4. The feeder of claim 3, wherein the frame assembly further comprises a dispensing drum mounting assembly coupled to the dispensing drum, the dispensing drum mounting assembly adapted for pivotable removal of the dispensing drum from the frame assembly.

5. The feeder of claim 1, further comprising:
    a mounting platform supporting the frame assembly, the mounting platform having a rotating support wherein the frame assembly can be rotatably positioned with respect to additional processing equipment.

6. The feeder of claim 1, wherein the receiving drum is operably coupled to a receiving drum drive system for operably rotating the receiving drum at a desired receiving speed and the dispensing drum is operably coupled to a dispensing drum drive system for operably rotating the dispensing drum at a desired dispensing speed.

7. The feeder of claim 6, further comprising:
    a feeder control system directing rotation of the receiving drum and dispensing drum such that one dispensing aperture row is positioned to receive edible particulates at the dispensing surface as one receiving aperture row is positioned to dispense edible particulates as the receiving surface.

8. The feeder of claim 7, wherein the feeder control system comprises a microprocessor-based controller or a Programmable-Logic-Controller.

9. The feeder of claim 7, wherein the receiving drum drive system and the dispensing drum drive system each comprise a variable speed motor and wherein the feeder control system selectively controls both variable speed motors to operably position the receiving rows and the dispensing rows for communication through the transfer bores.

10. A method for accurately portioning edible particulates comprising:

provinding a first rotary drum having a plurality of receiving aperture rows, each receiving aperture row having a plurality of receiving apertures with a selected receiving volume;

loading each receiving aperture row by rotating the first rotary drum such that the receiving aperture rows traverse a bulk particulate feeder filled with edible particulates;

transferring the edible particulates in each receiving aperture through a corresponding transfer bore in a transfer block; and rotating a second rotary drum having a plurality of dispensing apertures such that the dispensing apertures interface with the transfer bores to receive the edible particulates.

11. The method of claim 10, further comprising:

dispensing the edible particulates from the dispensing apertures.

* * * * *